(12) United States Patent
Kubo

(10) Patent No.: US 10,124,746 B2
(45) Date of Patent: Nov. 13, 2018

(54) AUTOMOBILE LID DEVICE

(71) Applicant: KASAI KOGYO CO., LTD., Kanagawa (JP)

(72) Inventor: Junichi Kubo, Machida (JP)

(73) Assignee: KASAI KOGYO CO., LTD., Koza-gun, Kanagawa (JP)

( * ) Notice: Subject to any disclaimer, the term of this patent is extended or adjusted under 35 U.S.C. 154(b) by 86 days.

(21) Appl. No.: 15/329,962

(22) PCT Filed: Mar. 31, 2015

(86) PCT No.: PCT/JP2015/060061
§ 371 (c)(1),
(2) Date: Jan. 27, 2017

(87) PCT Pub. No.: WO2016/042822
PCT Pub. Date: Mar. 24, 2016

(65) Prior Publication Data
US 2017/0259756 A1 Sep. 14, 2017

(30) Foreign Application Priority Data

Sep. 16, 2014 (JP) ................................. 2014-187392

(51) Int. Cl.
B60J 9/00 (2006.01)
B60R 13/02 (2006.01)
B60R 7/04 (2006.01)

(52) U.S. Cl.
CPC .......... B60R 13/0275 (2013.01); B60R 7/046 (2013.01)

(58) Field of Classification Search
CPC . B29C 45/0081; B29C 45/40; B29C 45/4407; B29L 2031/565; B65D 47/10;
(Continued)

(56) References Cited

U.S. PATENT DOCUMENTS 4,470,220 A * 9/1984 Sudo ..................... E05F 1/1075
220/264
5,044,678 A * 9/1991 Detweiler ............. E05B 47/026
292/144
(Continued)

FOREIGN PATENT DOCUMENTS

EP 1104689 A1 6/2001
JP 1989-62132 U 4/1989
(Continued)

OTHER PUBLICATIONS

International Search Report for International Application No. PCT/JP2015/060061 dated Jun. 16, 2015, 2 pages, Japan.

Primary Examiner — Kiran B Patel
(74) Attorney, Agent, or Firm — United IP Counselors, LLC

(57) ABSTRACT

The automobile lid device capable of opening and closing an opening of an automobile interior component includes a lid body configured to open and close the opening by being attached to and detached from the opening; a first engaging claw arranged at a periphery edge of the lid body, the first engaging claw having an outwardly downward inclination section; and a second engaging claw arranged at a periphery edge of the opening having an inwardly upward inclination section. Faces of the outwardly downward inclination section and the inwardly upward inclination section are engaged as being mutually contacted such that the outwardly downward inclination section crawls under a lower face of the inwardly upward inclination section when the lid body is attached to the opening.

4 Claims, 2 Drawing Sheets

(58) Field of Classification Search
CPC .......... B65D 2543/00092; B65D 2543/00537; B65D 2543/00555; B65D 2543/00296; B65D 43/0218
USPC ...................................................... 296/1.08
See application file for complete search history.

(56) References Cited

U.S. PATENT DOCUMENTS

| | | | | |
|---|---|---|---|---|
| 5,263,511 A * | 11/1993 | Ohasi | ............... | B60K 15/03519 |
| | | | | 137/588 |
| 5,437,491 A * | 8/1995 | Nedbal | .............. | B60K 15/0406 |
| | | | | 220/86.2 |
| 5,462,190 A * | 10/1995 | Lienhart | ............ | B60K 15/0406 |
| | | | | 220/375 |
| 5,611,580 A * | 3/1997 | Choi | ....................... | B60K 15/05 |
| | | | | 292/125 |
| 5,658,036 A * | 8/1997 | Benoist | .................. | B60K 15/05 |
| | | | | 220/86.2 |
| 5,664,811 A * | 9/1997 | Martus | ................... | B60K 15/05 |
| | | | | 292/144 |
| 5,924,757 A * | 7/1999 | Stapf | ...................... | B60K 15/05 |
| | | | | 16/82 |
| 5,954,387 A * | 9/1999 | Fisher | ................ | B60K 15/0406 |
| | | | | 220/86.2 |
| 6,193,093 B1 * | 2/2001 | Brunner | ............ | B60K 15/0406 |
| | | | | 220/234 |
| 6,237,798 B1 * | 5/2001 | Sung | ................. | B60K 15/0406 |
| | | | | 220/375 |
| 6,345,420 B1 | 2/2002 | Nabeshima | | |
| 6,883,680 B2 * | 4/2005 | Hirose | ...................... | B60R 7/04 |
| | | | | 220/264 |
| 7,914,063 B2 * | 3/2011 | Lederer | .................. | B60K 15/04 |
| | | | | 292/207 |
| 8,382,187 B2 * | 2/2013 | Guendouz | .......... | B60K 15/0406 |
| | | | | 141/348 |
| 9,452,664 B2 * | 9/2016 | Kwon | ....................... | B60J 5/047 |
| 9,662,990 B2 * | 5/2017 | Jeong | ..................... | B60K 15/05 |
| 2001/0054829 A1 * | 12/2001 | Hagano | ............... | B60K 15/0406 |
| | | | | 296/97.22 |
| 2008/0136210 A1 * | 6/2008 | Scott | ...................... | B60K 15/04 |
| | | | | 296/97.22 |
| 2009/0026794 A1 * | 1/2009 | Zentner | .................. | B60K 15/05 |
| | | | | 296/97.22 |
| 2009/0189410 A1 * | 7/2009 | Gurtatowski | .......... | B60K 15/05 |
| | | | | 296/97.22 |
| 2009/0309386 A1 * | 12/2009 | Yamamoto | ......... | B60K 15/0406 |
| | | | | 296/97.22 |
| 2012/0153661 A1 * | 6/2012 | Woodworth | ........... | B60K 15/05 |
| | | | | 296/97.22 |
| 2013/0134737 A1 * | 5/2013 | Ogata | ..................... | B60K 15/05 |
| | | | | 296/97.22 |
| 2013/0206757 A1 * | 8/2013 | Nagai | ................ | B60K 15/0406 |
| | | | | 220/86.2 |
| 2014/0084620 A1 * | 3/2014 | Frommann | ............ | B60K 15/05 |
| | | | | 296/97.22 |
| 2015/0048644 A1 * | 2/2015 | Georgi | ................... | B60K 15/05 |
| | | | | 296/97.22 |

FOREIGN PATENT DOCUMENTS

| | | |
|---|---|---|
| JP | 1991-24947 U | 3/1991 |
| JP | 2001-322507 A | 11/2001 |
| JP | 2007-168513 A | 7/2007 |
| WO | 2000/062970 A1 | 10/2000 |

* cited by examiner

FIG. 2A
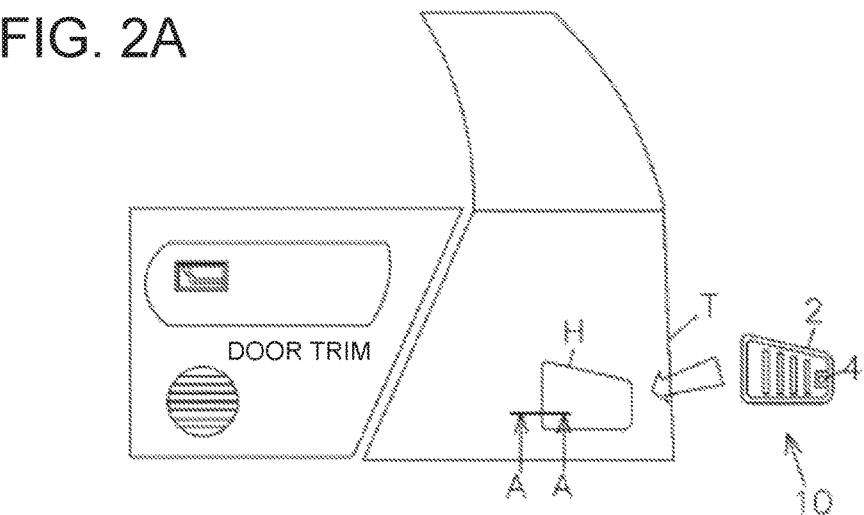
FIG. 2B
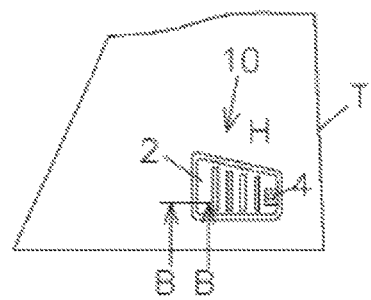
FIG. 2C          FIG. 2D
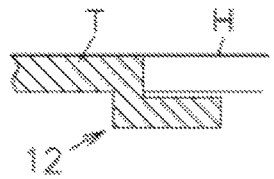    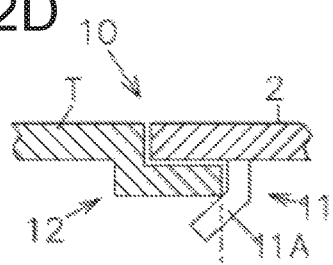
FIG. 2E
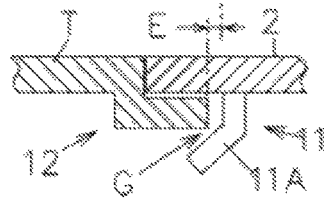

AUTOMOBILE LID DEVICE

CROSS-REFERENCE TO RELATED APPLICATIONS

This application is a National Stage Entry application of PCT International Application No. PCT/JP2015/060061, filed on Mar. 31, 2015, which claims the priority benefit of Japanese Patent Application No. 2014-187392, filed on Sep. 16, 2014, the entire contents of both of which are hereby incorporated by reference.

BACKGROUND

1. Technical Field

The present invention relates to an automobile lid device capable of opening and closing an opening of an automobile interior component by a lid body being attached to and detached from the opening. In particular, the present invention relates to an automobile lid device capable of being adopted to a case that an opening is formed by cutting with laser light or water jet being apt to cause relatively large dimensional variation while attaching malfunction of a lid body to the opening can be prevented as absorbing the dimensional variation of the opening.

2. Description of the Background

Traditionally, there have been known a luggage side trim and a trunk side trim as automobile interior components that trim side wall faces of a luggage room and a trunk room of a vehicle.

A storing portion capable of storing small items such as a jack and others is arranged between a luggage side trim and a body side wall panel. For enabling the small items to be carried into and out from the storing portion, an automobile lid device is arranged at the luggage side trim.

FIG. 2 is an explanatory view of a traditional automobile lid device arranged at a luggage side trim. In a traditional automobile lid device 10 illustrated in FIG. 2, an opening H is formed at a luggage side trim T as an entry port of the abovementioned storing portion (not illustrated). The opening H is capable of being opened and closed by a lid body 2 being attached to and detached from the opening H. Such an automobile lid device is disclosed, for example, in Japanese Patent Application Laid-open No. 2007-168513.

In the traditional automobile lid device 10 of FIG. 2, an engaging claw 11 shaped as protruded from a back face of the lid body 2 is arranged at a peripheral edge of the lid body 2. A distal end side of the engaging claw 11 has downward inclination toward the outer side viewing from the inner side of the lid body 2 serving as an outwardly downward inclination section 11A having a predetermined length. Meanwhile, a step 12 having a depth corresponding to the thickness of the lid body 2 is formed at a periphery edge of the opening H, so as to be lower than a front face of the luggage side trim T by one step.

At the time when the lid body 2 is attached to the opening H at the luggage side trim T, an outwardly downward inclination section 11A at the distal end of the engaging claw 11 described above is caused to crawl under the periphery edge of the opening H (specifically, a lower step portion of the step 12, being the same in the following), so that the periphery edge of the opening H is sandwiched by the outwardly downward inclination section 11A at the distal end of the crawled engaging claw 11 and the periphery edge of the lid body 2.

There has been known a method (piercing) to form such an opening H by press-cutting with a die. However, since a die to be used for piercing is large and expensive, it has been studied to adopt a method to form an opening H at a luggage side trim T using a more compact and less expensive apparatus than piercing, for example, a method to form an opening H at a luggage side trim T by cutting with laser light or water jet.

Dimensional comparison between openings formed with piercing and openings formed by cutting with laser light or water jet shows that dimensional variation of the openings formed by cutting with laser light or water jet becomes relatively larger.

FIG. 2E is an explanatory view for dimensional variation in which dimensional variation of the opening is indicated by a reference sign E with respect to FIG. 2D.

The opening H formed at the luggage side trim T in FIG. 2E is larger than the opening H formed at the luggage side trim T in FIG. 2D by the amount of the dimensional variation E. In a case with the opening having the relatively large dimensional variation E as illustrated in FIG. 2D, in the traditional automobile lid device 10 described above, a gap G is generated between the outwardly downward inclination section 11A at the distal end of the crawled engaging claw 11 and the peripheral edge of the lid body 2 to cause rattling in the height direction of the gap G when the lid body 2 is attached to the opening H. Thus, such dimensional variation of the opening H cannot be sufficiently absorbed, causing a problem that attaching malfunction of the lid body 2 to the opening H is apt to occur.

Consequently, for preventing occurrence of attaching malfunction of the lid body 2 to the opening H in the traditional automobile lid device 10, it has been the only choice to form the opening H at the luggage side trim T with piercing using a large and expensive die. Accordingly, it has not been adopted to use a method to form an opening H at a luggage side trim T using a more compact and less expensive apparatus than piercing, specifically, a method to form an opening H at a luggage side trim T by cutting with laser light or water jet.

BRIEF SUMMARY

To solve the abovementioned problems, an object of the present invention is to provide an automobile lid device capable of being adopted to a case that an opening formed at an automobile interior component such as a luggage side trim and a trunk side trim is formed by cutting with laser light or water jet being apt to cause relatively large dimensional variation while attaching malfunction of a lid body to the opening can be prevented as absorbing the dimensional variation of the opening.

In the present invention, dimensional variation of the opening may be absorbed so that the faces of the outwardly downward inclination section and the inwardly upward inclination section are prevented from being separated owing to that contact length between the faces becomes short when the lid body is attached to the opening in a case that the dimensional variation occurs at the opening.

In the present invention, height of the inwardly upward inclination section may be set to be lower than the automobile interior component by thickness of the lid body so that the lid body and the automobile interior component become flush while the lid body is attached to the opening of the automobile interior component.

To achieve the abovementioned object, an automobile lid device capable of opening and closing an opening of an automobile interior component includes:

a lid body configured to open and close the opening by being attached to and detached from the opening;

a first engaging claw arranged at a periphery edge of the lid body, the first engaging claw protruded from a back face of the lid body, a distal end side of the first engaging claw having downward inclination toward an outer side viewing from an inner side of the lid body serving as an outwardly downward inclination section having a predetermined length; and a second engaging claw arranged at a periphery edge of the opening, the second engaging claw protruded from a back face of the automobile interior component, a distal end side of the second engaging claw having upward inclination toward an inner side of the opening serving as an inwardly upward inclination section having a predetermined length. Here, faces of the outwardly downward inclination section and the inwardly upward inclination section are engaged as being mutually contacted such that the outwardly downward inclination section crawls under a lower face of the inwardly upward inclination section when the lid body is attached to the opening.

As a specific structure of the automobile lid device, the present invention adopts a structure that the faces of the inclination sections are engaged as being mutually contacted such that the outwardly downward inclination section crawls under the lower face of the inwardly upward inclination section when the lid body is attached to the opening, as described above. Accordingly, for example, in a case with the opening having relatively large dimensional variation, when the lid body is attached to the opening, the contact length between the faces of the outwardly downward inclination section and the inwardly upward inclination section becomes short. Thus, the dimensional variation of the opening is absorbed, so that the faces thereof are prevented from being separated. Accordingly, since the contact of the faces restricts the attaching position of the lid body in the perpendicular direction, attaching malfunction such as rattling can be prevented from occurring at the lid body attached to the opening even in a case with the opening having large dimensional variation. Therefore, it is possible to provide an automobile lid device capable of being adopted for a case that an opening is formed by cutting with laser light or water jet being apt to cause relatively large dimensional variation.

BRIEF DESCRIPTION OF DRAWINGS

FIG. 1A is a schematic plane view of a luggage side trim (automobile interior component) that trims a side wall face of a luggage room and a door trim that is arranged next thereto, FIG. 1B is an explanatory view of a state that a lid body is attached to an opening formed at the luggage side trim of FIG. 1A, FIG. 1C is a sectional view at C-C in FIG. 1A, FIG. 1D is a sectional view at D-D in FIG. 1B, and FIG. 1E is an explanatory view for dimensional variation in which dimensional variation of the opening is indicated by a reference sign E with respect to FIG. 1D.

FIGS. 2A to 2E are explanatory views of an automobile lid device in a related art; FIG. 2A is a schematic plane view of a luggage side trim and a door trim arranged next thereto, FIG. 2B is an explanatory view of a state that a lid body is attached to an opening formed at the luggage side trim of FIG. 2A, FIG. 2C is a sectional view at A-A in FIG. 2A, FIG. 2D is a sectional view at B-B in FIG. 2B, and FIG. 2E is an explanatory view for dimensional variation in which dimensional variation of the opening is indicated by a reference sign E with respect to FIG. 2D.

DETAILED DESCRIPTION

In the following, an embodiment of the present invention will be described in detail with reference to the attached drawings.

Figure 1A:
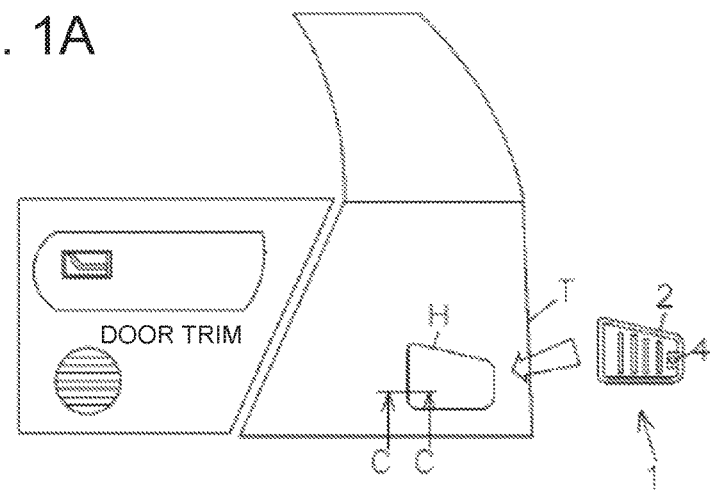
FIGS. 1A to 1E are explanatory views of an automobile lid device to which the present invention is applied.
Figure 1B:
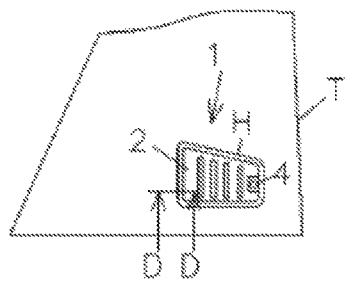
Figure 1C:
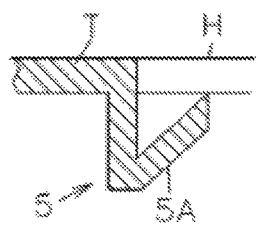
Figure 1D:
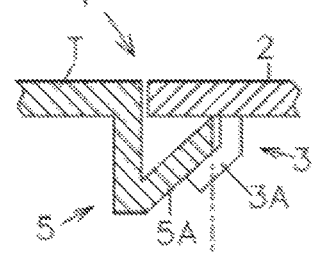

FIGS. 1A to 1E are explanatory views of an automobile lid device to which the present invention is applied; FIG. 1A is a schematic plane view of a luggage side trim (automobile interior component) that trims a side wall face of a luggage room and a door trim that is arranged next thereto, FIG. 1B is an explanatory view of a state that a lid body is attached to an opening formed at the luggage side trim of FIG. 1A, FIG. 1C is a sectional view at C-C in FIG. 1A, and FIG. 1D is a sectional view at C-C in FIG. 1B.

Referring to FIG. 1A, a storing portion (not illustrated) capable of storing small items such as a jack and others is arranged between a luggage side trim T and an unillustrated body side wall panel located at the back face side thereof. For enabling the small items to be carried into and out from the storing portion, an automobile lid device 1 (see FIG. 1B) of the present embodiment is arranged at the luggage side trim T.

In the automobile lid device 1 of the present embodiment, an opening H as illustrated in FIG. 1A is formed at the luggage side trim T as an entry port of the abovementioned storing portion (not illustrated). The opening H is capable of being opened and closed by a lid body 2 being attached to and detached from the opening H.

Referring to FIGS. 1B and 1D, a first engaging claw 3 shaped as being protruded from a back face of the lid body 2 is arranged at a peripheral edge of the lid body 2 on the left side. As illustrated in FIG. 1D, a distal end side of the first engaging claw 3 has downward inclination toward the outer side viewing from the inner side of the lid body 2 serving as an outwardly downward inclination section 3A having a predetermined length.

Further, a screw hole 4 is formed at a peripheral edge of the lid body 2 on the right side. Here, it is also possible that the first engaging claw 3 is arranged on the right side at the peripheral edge of the lid body 2 and the screw hole 4 is arranged on the left side at the peripheral edge of the lid body 2.

Referring to FIGS. 1A and 1C, a second engaging claw 5 shaped as being protruded from a back face of the luggage side trim T is arranged at a peripheral edge of the opening H at the luggage side trim T (specifically, at a position being adjacent to the first engaging claw 3 of the lid body 2 when the lid body 2 is attached at the opening H). As illustrated in FIG. 1C, a distal end side of the second engaging claw 5 has upward inclination toward the inner side of the opening H serving as an inwardly upward inclination section 5A having a predetermined length.

Height of the inwardly upward inclination section 5A at the distal end of the second engaging claw 5 may be appropriately changed as needed. In the automobile lid device 1 of the present embodiment, the height of the inwardly upward inclination section 5A at the distal end of the second engaging claw 5 is set to be lower than the luggage side trim T by the thickness of the lid body 2 as illustrated in FIG. 1D so that the lid body 2 and the luggage side trim T become flush in a state that the lid body 2 is attached to the opening H at the luggage side trim T.

Further, referring to FIG. 1D, at the time when the lid body 2 is attached to the opening H, faces of the inclination sections 3A, 5A are engaged as being mutually contacted in a state that the outwardly downward inclination section 3A crawls under the lower face of the inwardly upward inclination section 5A.

In the automobile lid device 1 of the present embodiment structured as described above, attaching operation of the lid body 2 to the opening H at the luggage side trim T is performed with procedure 1 and procedure 2 described below.

Procedure 1

When attaching the lid body 2 to the opening H at the luggage side trim T, first, the lid body 2 is tilted above the opening H, and then, the first engaging claw 3 is made crawl under the second engaging claw 5 as illustrated in FIG. 1D.

Thus, the outwardly downward inclination section 3A of the first engaging claw 3 and the inwardly upward inclination section 5A of the second engaging claw 5 are faced each other and the faces of the inclination sections 3A and 5A are engaged as being mutually contacted.

Procedure 2

Subsequently, a screw is inserted to the screw hole 4 and tightened for being fixed. Thus, the attaching operation of the lid body 2 to the opening H at the luggage side trim T is completed.

Description in a Case With Large Dimensional Variation of the Opening H

Figure 1E:
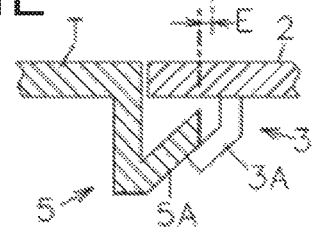

FIG. 1E is an explanatory view for dimensional variation in which dimensional variation of the opening H is indicated by a reference sign E with respect to FIG. 1D.

The opening H formed at the luggage side trim T in FIG. 1E is larger than the opening H formed at the luggage side trim T in FIG. 1D by the amount of the dimensional variation E.

In a case with the opening H having the relatively large dimensional variation E as illustrated in FIG. 1E, when the lid body 2 is attached to the opening H (see procedure 1), the contact length between the faces of the outwardly downward inclination section 3A and the inwardly upward inclination section 5A becomes short as illustrated in FIG. 1E. Thus, the dimensional variation of the opening H is absorbed, so that the faces thereof are prevented from being separated.

According to the automobile lid device 1 of the present embodiment, the abovementioned contact of the faces of the outwardly downward inclination section 3A and the inwardly upward inclination section 5A restricts the attaching position of the lid body 2 in the perpendicular direction even in a case with the opening H having large dimensional variation as illustrated in FIG. 1E. Accordingly, attaching malfunction such as rattling is prevented from occurring at the lid body 2 attached to the opening H. Therefore, the above can be adopted for a case that the opening H is formed by cutting with laser light or water jet being apt to cause relatively large dimensional variation E.

Not limited to the abovementioned embodiment, the present invention may be modified variously by a person skilled in the art within the technical scope of the present invention.

In the abovementioned embodiment, description is provided on the example that the present invention is applied to an automobile lid device of a luggage side trim. However, not limited thereto, the present invention can be applied to an automobile lid device arranged at an automobile interior component other than a luggage side trim.

REFERENCE SIGNS LIST

1 Automobile lid device
2 Lid body
3 First engaging claw
3A Outwardly downward inclination section
4 Screw hole
5 Second engaging claw
5A Inwardly upward inclination section
10 Automobile lid device (Related art)
11 Engaging claw (Related art)
11A Outwardly downward inclination section (Related art)
12 Step (Related art)
E Dimensional variation
G Gap
H Opening
T Luggage side trim (Automobile interior component)

The invention claimed is:

1. An automobile lid device capable of opening and closing an opening of an automobile interior component, the automobile lid device comprising:
   a lid body configured to open and close the opening by being attached to and detached from the opening;
   a first engaging claw arranged at a periphery edge of the lid body, the first engaging claw protruded from a back face of the lid body, a distal end side of the first engaging claw having downward inclination toward an outer side viewing from an inner side of the lid body serving as an outwardly downward inclination section having a predetermined length; and
   a second engaging claw arranged at a periphery edge of the opening, the second engaging claw protruded from a back face of the automobile interior component, a distal end side of the second engaging claw having upward inclination toward an inner side of the opening serving as an inwardly upward inclination section having a predetermined length;
   wherein faces of the outwardly downward inclination section and the inwardly upward inclination section are engaged as being mutually contacted such that the outwardly downward inclination section crawls under a lower face of the inwardly upward inclination section when the lid body is attached to the opening.

2. The automobile lid device according to claim 1, wherein dimensional variation of the opening is absorbed so that the faces of the outwardly downward inclination section and the inwardly upward inclination section are prevented from being separated owing to that contact length between the faces becomes short when the lid body is attached to the opening in a case that the dimensional variation occurs at the opening.

3. The automobile lid device according to claim 1, wherein height of the inwardly upward inclination section is set to be lower than the automobile interior component by thickness of the lid body so that the lid body and the automobile interior component become flush while the lid body is attached to the opening of the automobile interior component.

4. The automobile lid device according to claim 2, wherein height of the inwardly upward inclination section is set to be lower than the automobile interior component by thickness of the lid body so that the lid body and the automobile interior component become flush while the lid body is attached to the opening of the automobile interior component.

* * * * *